3,306,957
PRODUCTION OF NUCLEAR FUEL MATERIALS
John Robert McLaren, Chieveley, near Newbury, England, assignor to United Kingdom Atomic Energy Authority, London, England
No Drawing. Filed May 21, 1965, Ser. No. 457,790
Claims priority, application Great Britain, June 12, 1964, 24,475/64
7 Claims. (Cl. 264—.5)

The present invention relates to fuels for nuclear reactors and is particularly concerned with fuels which are suitable for use in fast and advanced thermal reactors.

At the fuel temperatures contemplated for such reactors, which are in the region of 600–800° C. at the surface of the fuel or fuel element can, it is clearly impracticable to use metallic uranium as the fuel by reason of the phase changes and low melting point of the metal. Several alternative proposals have been put forward and these include the use of ceramic materials such as uranium dioxide, uranium carbide and uranium nitride and also the corresponding compounds of thorium and plutonium. Although uranium dioxide is presently the most widely used of these materials, it appears that uranium carbide will prove more satisfactory in certain respects, the most important of which is the considerably higher thermal conductivity of uranium carbide as compared with uranium dioxide. Uranium carbide however is liable to rapid corrosion by air or oxygen and it is desirable to provide a material having a higher corrosion resistance than uranium carbide.

At the present time it appears that uranium nitride has all the desirable properties of uranium carbide and in addition possesses a much greater resistance to atmospheric corrosion. Since there exists a series of solid solutions between uranium carbide and uranium nitride, the substitution of nitrogen for at least part of the carbon in the carbide should result in a fuel material having an improved corrosion resistance as compared with the pure carbide.

Hitherto however it has not proved possible to readily obtain a uranium nitride sintered body having a density much in excess of 12 gms./cc. and such bodies have been found to contain free uranium metal which appears to be produced at the high sintering temperature (1800° C.) hitherto necessary.

It is the object of the present invention to provide a process for producing a fuel body for a nuclear reactor containing uranium nitride or uranium carbonitride and optionally also containing the corresponding plutonium or thorium compound.

According to the present invention there is provided a process for the production of a fuel body for a nuclear reactor comprising taking a uranium nitrride or uranium carbonitride power having a particle size substantially in the range 0.1 to 5 microns, a nitrogen or nitrogen plus carbon content in the range 48 to 52 atomic percent and an oxygen content below 1 percent by weight, compacting such powder into pellets and sintering such pellets in an inert atmosphere of high purity.

If desired a proportion of uranium carbide powder may be mixed with the uranium nitride powder prior to compacting whereby on sintering a mixed uranium nitride, uranium carbide body is obtained. If such a mixture of uranium nitride and uranium carbide is used in the process of the present invention, then the specification of the carbide powder used should be similar to that of the mixed uranium-plutonium carbide used in the process of our British Patent Specification 954,720, namely a particle size substantially in the range 2–4 microns, a carbon content of 48 to 53 atomic percent and an oxygen content of less than 1% by weight. It may however be preferred that the particle size of the carbide powder should be similar to that of the nitride powder, i.e. 0.1 to 5 microns. It will be appreciated that if a powdered solid solution of carbonitride is used as the starting material of the present invention, the carbon and nitrogen contents may vary quite considerably provided the sum of carbon plus nitrogen falls within the limits of 48 to 52 atomic percent.

The sintering is conveniently effected at a temperature in the range 1450°–1700° C. At the lower temperatures in this range densities of about 85% of the theoretical may be obtained whilst at the higher temperatures, densities approaching theoretical may be attained. Under no conditions using the present invention has the formation of free uranium metal been observed.

The sintering atmosphere is conveniently argon containing less than 10 p.p.m. of oxygen and less than 10 p.p.m. of water vapour, and preferably containing no more than 2 p.p.m. of oxygen and 2 p.p.m. of water vapour. The very high purity sintering atmosphere is conveniently obtained by passing commercially available high purity argon (99.995% pure) through a molecular sieve and then over a gettering agent, for example hot uranium or hot zirconium, which may be located at the entrance to the furnace and which removes essentially all of the final traces of oxygen from the atmosphere.

A proportion of plutonium or thorium nitride or carbonitride may be mixed with the uranium nitride or uranium carbonitride powder respectively prior to compacting the powder. The resulting fuel body might be suitable for use in a fast reactor or a breeder reactor. The powdered plutonium or thorium compounds used would have the same particle size and corresponding composition as the powdered uranium compound with which they were mixed.

The uranium nitride may be prepared by any of the known methods, for example, the action of nitrogen on uranium metal and the carbonitride may be prepared, for example, by the action of nitrogen on a mixture of uranium oxide and carbon. The nitride and carbonitride may then be formed into powders of the desired particle size by grinding in a suitable mill, for example, a tungsten carbide vibratory mill, for several hours. We have found that a grinding time of 16–32 hours gives a powder having a particle size within the specified range of 0.1 to 5 microns.

The powders may be compacted using a compacting pressure within the range 10–100 tons per square inch, a pressure in the range 40–80 tons per square inch being preferred. However, we have found that the compacting pressure used has only a slight effect on the sintered density compared to the effect of sintering temperature on the sintered density.

Hitherto, it has proved difficult to obtain suitable sintered uranium nitride or uranium carbonitride, and it is thought that the reason for this is that an excessive quantity of oxygen has been introduced into the powders either before or during sintering. In the present invention the introduction of oxygen during sintering is minimised by the use of a very high purity inert atmosphere. During grinding of the nitride or carbonitride and subsequent compacting to form a pellet, the handling is preferably carried out in an inert atmosphere such as argon containing less than 20 p.p.m. of oxygen and less than 20 p.p.m. of water vapour, and preferably no more than 10 p.p.m. of oxygen and no more than 10 p.p.m. of water vapour. It will however be appreciated that the method of preparation of the starting powder does not form an essential part of the present invention and the only requirement is that the method used gives a powder satisfying the conditions for use in the present invention. However it must be pointed out that unless suitable precautions are taken, the very fine powder is so reactive that oxygen pick-up from the atmosphere will probably result in a powder outside the scope of the present invention.

EXAMPLE 1

In an arrangement in accordance with the invention, uranium nitride having a nitrogen content of 5.45 weight percent is obtained by the action of nitrogen on uranium metal and ground for a long time (16–32 hours) in a suitable mill to give a powder having a particle size within the range 0.1 to 5 microns. The powder is then formed into a pellet by compacting using a pressure of 80 tons per square inch preferably using a die wall lubricant such as stearic acid. The compacts produced in this way have a green density of 10 gms./cc. and are sintered in argon purified in the manner hereinbefore described at 1700° C. for approximately two hours whilst being supported in molybdenum boats. The product obtained is notable for its silvery appearance and has a bulk density of 13.7 gms./cc. showing that the porosity is small. It should be noted that the theoretical density of the nitride is 14.3 gms./cc.

EXAMPLES 2–7

The procedure of Example 1 was repeated using a compacting pressure of 40 tons per square inch and sintering for a period of two hours at various temperatures. The results are summarised in Table I from which it can be seen that the sintered density varies with the sintering temperature in a more or less linear manner and that densities of about 85% of theoretical may be obtained with a sintering temperature as low as 1450° C.

TABLE I

| Example | Sintering temperature (° C.) | Sintered density (gm./cc.) |
|---|---|---|
| 2 | 1,450 | 12.24 |
| 3 | 1,500 | 12.46 |
| 4 | 1,550 | 12.75 |
| 5 | 1,600 | 13.21 |
| 6 | 1,650 | 13.22 |
| 7 | 1,700 | 13.5 |

EXAMPLES 8–14

The procedure of Example 1 was repeated using a number of compacting pressures, sintering temperatures of 1550° C. and 1700° C. and a sintering time of 2 hours. The results are summarised in Table II and it will be observed that the effect of increasing the compacting pressure is less than the effect of increasing the sintering temperature.

TABLE II

| Example | Sintering temperature (° C.) | Compacting pressure (t.s.i.) | Sintered Density (g./cc.) |
|---|---|---|---|
| 8 | 1,550 | 20 | 12.45 |
| 9 | 1,550 | 40 | 12.76 |
| 10 | 1,550 | 60 | 12.85 |
| 11 | 1,550 | 80 | 12.92 |
| 12 | 1,700 | 40 | 13.47 |
| 13 | 1,700 | 60 | 13.57 |
| 14 | 1,700 | 80 | 13.70 |

EXAMPLE 15

The procedure of Example 1 was repeated using a compacting pressure of 80 tons per square inch, a sintering temperature of 1700° C. and a sintering time of ten hours. The sintered density was 13.9 gms./cc. (97% theoretical). This experiment indicates that increasing the sintering time results in a comparatively small increase in density.

EXAMPLE 16

The procedure of Example 1 was repeated using mixed uranium nitride—uranium carbide powders, the content of uranium carbide in the mixture being 4.82 percent by weight. Using a compacting pressure of 40 tons per square inch and sintering temperature of 1550° C. for two hours, a density of 13 gms./cc. was obtained. It is believed that the increased density obtained when the uranium nitride has a small uranium carbide content is due to the fact that oxygen is more soluble in uranium carbide than in uranium nitride and this results in improved sintering behaviour using the mixed carbides.

EXAMPLE 17

The procedure of Example 16 was repeated using mixed powders having a uranium nitride content of 30% by weight. The sintered density obtained was 13.2 gms./cc.

It will be appreciated that fuel bodies made by the described process are also within the scope of the present invention.

I claim:

1. A process for the production of a fuel body for a nuclear reactor comprising taking a powdered uranium compound selected from the group consisting of uranium nitride and uranium carbonitride, wherein such powder has a particle size substantially in the range 0.1 to 5 microns, an oxygen content below 1 percent by weight, and 48 to 52 atomic percent of non-metallic elements selected from the group consisting of nitrogen and nitrogen plus carbon, compacting such powder to form pellets and sintering such pellets in an inert atmosphere of high purity.

2. The process of claim 1 wherein the said uranium compound is uranium nitride, a proportion of uranium carbide powder is mixed with the powdered uranium nitride and the mixed powders are compacted and sintered.

3. The process of claim 1 wherein sintering is effected at a temperature in the range 1450° C. to 1700° C.

4. The process of claim 1 wherein the sintering atmosphere is argon containing less than 10 parts per million of oxygen and less than 10 parts per million of water vapour.

5. The process of claim 4 wherein the sintering atmosphere is argon containing not more than 2 parts per million of oxygen and 2 parts per million of water vapour.

6. The process of claim 1 wherein a powdered nuclear metal nitride selected from the group consisting of plutonium nitride and thorium nitride is mixed with the uranium nitride powder, compacted and sintered.

7. The process of claim 1 wherein a powdered nuclear metal carbonitride selected from the group consisting of plutonium carbonitride and thorium carbonitride is mixed with the uranium carbonitride powder, compacted and sintered.

References Cited by the Examiner

UNITED STATES PATENTS

| 3,211,664 | 10/1965 | Endebrock | 252—301.1 |
| 3,213,032 | 10/1965 | Hammond | 252—301.1 |
| 3,213,161 | 10/1965 | Craig | 264—.5 |

CARL D. QUARFORTH, *Primary Examiner.*

BENJAMIN R. PADGETT, *Examiner.*

S. J. LECHERT, *Assistant Examiner.*